Figure 1:
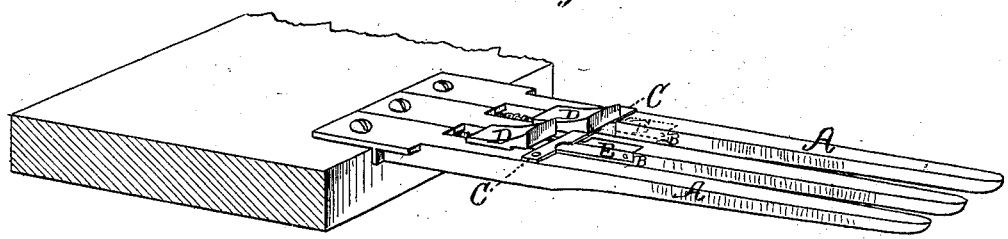

No. 104,846.  
PATENTED JUNE 28, 1870.  
G. B. HAMLIN.  
CORN HARVESTER.

Witnesses:  
Phil. F. Larner  
Frank A. Jackson

Inventor:  
George B. Hamlin  
By Wm. C. Wood  
Attorney.

United States Patent Office.

GEORGE B. HAMLIN, OF WILLIMANTIC, CONNECTICUT.

Letters Patent No. 104,846, dated June 28, 1870.

IMPROVEMENT IN CORN-HARVESTERS.

The Schedule referred to in these Letters Patent and making part of the same.

To all whom it may concern:

Be it known that I, GEORGE B. HAMLIN, of the town of Willimantic, county of Windham, in the State of Connecticut, have invented a certain new and useful Picker for Corn-Harvesters My invention consists in combining with the fingers of a picker, a cutting-blade provided with a shield, so arranged that the cutting-edge will only be permitted to operate at the base of each ear of corn; and I do hereby declare that the following specification, taken in connection with the drawing, furnished and forming a part of the same, is a true, clear, and exact description thereof, reference being had to the drawing.

Figure 1 represents, in perspective, a sufficient number of fingers to illustrate my invention. They are attached to an arm, which, in turn, may be attached in an obvious manner to any corn-harvester.

A, in each case, represents the finger.

B represents the holding-spaces between the fingers, of a width equal to the general diameter of a corn-stalk.

C represents the cutting-blades, set across the spaces near the butts of the fingers.

D represents recessed guards, which are mounted upon spring spindles, so set as to constantly press the guard forward over the cutting-blade.

E represents a spring latch. It is set upon and pivoted to one, or, it may be, on both sides of the inside upper edge of the spaces B, upon the fingers A, near the cutting-blades.

The swinging end of the latch enters a recess in the interior of the guard D, and engages with a shoulder therein.

When the latch is free from pressure its spring causes its latch end to engage with the shoulder in such a manner as will cause the guard to be rigidly fixed in its position, securely covering the edge of the cutting-blades.

Upon receiving vertical pressure, the latch disengages from the guard shoulder, and permits it to readily slide back and expose the cutting-edge.

Figure 2:
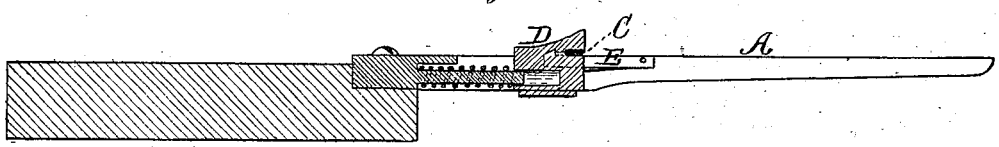

Figure 2 represents the same in longitudinal vertical section. Parts are marked with same letters of reference.

The operation of my picker is as follows:

The fingers A are made to embrace the stalks at or near the ground. As they are raised the outer ends of the fingers are elevated slightly. While being so raised the stalk presents but little if any resistance to the upper edge of the fingers, and the guards prevent contact between the stalks and the cutting-blades. The ears of corn, however, being of a greater diameter than the stalks, do not pass through the spaces, and, consequently, upon their contact with the spring-latch E, the guard D is released, and the bearing of the ear upon the inclined upper surfaces of the fingers carries it against the cutting-blade, which severs it from the stalk.

My picker may also be attached to the front end of a platform on wheels, and arranged to engage with the standing stalks below the ears, and thus effect the picking operation by a forward movement only.

Having thus described my invention,

I claim as new and desire to secure by Letters Patent—

1. The combination of the cutting-edge, sliding guard, and spring latch, with the fingers of a corn-harvester, substantially as shown and described for the purposes specified.

2. The combination of the latch E, guard D, and cutting-blade C, substantially as shown and described.

GEORGE B. HAMLIN.

Witnesses:
WILLIAM R. PATTEN,
PHIL. F. LAMER.